R. L. STEVENS.
Locomotive.

No. 2,773.　　　　　　　　　　　Patented Sept. 3, 1842.

Witnesses:　　　　　　　　　　　　　　　Inventor:

UNITED STATES PATENT OFFICE.

ROBERT L. STEVENS, OF NEW YORK, N. Y.

METHOD OF CONNECTING THE DRIVING-WHEELS OF LOCOMOTIVE STEAM-ENGINES.

Specification of Letters Patent No. 2,773, dated September 3, 1842.

*To all whom it may concern:*

Be it known that I, ROBT. L. STEVENS, of the city of New York, in the county of New York and State of New York, have invented a method whereby two or more separate pairs of wheels of locomotive-engines can be conveniently connected so that the power may be communicated from one pair to another, and do hereby declare that the following is a full and accurate description thereof.

For the purpose of effecting the intended object I place an additional pair of wheels, which I call connecting wheels, directly on the top of the two pair to be connected. This additional pair must have its axle parallel to the other two axles and the periphery of each of its wheels in contact with the peripheries of the wheels to be connected and must be pressed down upon them by a spring of the requisite strength. By this means any motion which may be communicated to one pair will by means of the adhesion of the wheels be communicated through the connecting wheels to the other pair. This will be more clearly understood by a reference to the accompanying drawing.

Figure 1:
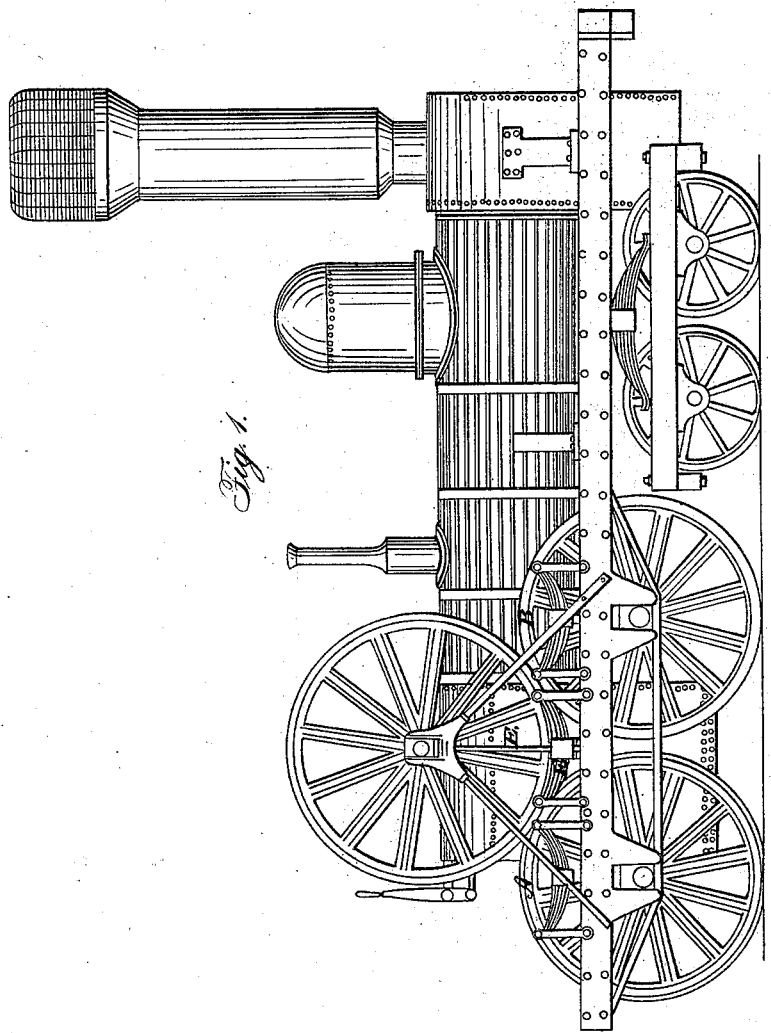

Figure 1 is a longitudinal elevation of a locomotive engine in which B represents one of the driving wheels, C one of the connecting wheels, and A one of the wheels to which the motion from B is to be communicated. E is the spring and shaft pressing or drawing the wheel C upon the wheels A and B.

Figure 2:
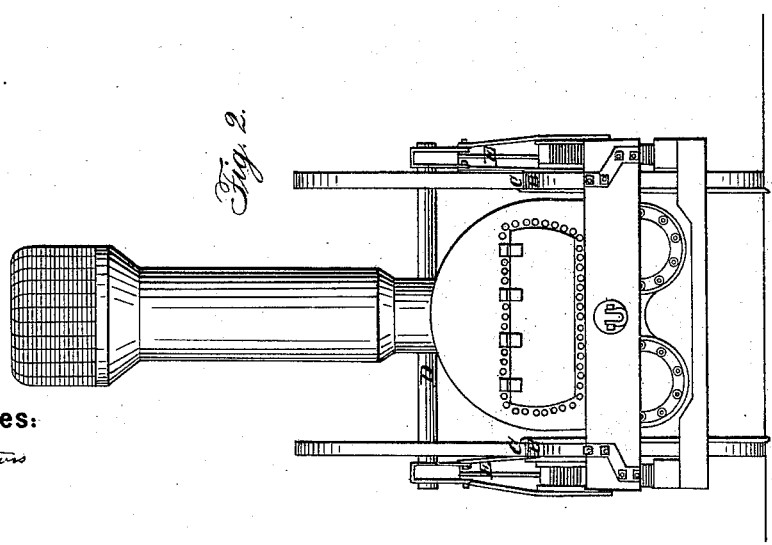

Fig. 2 is an end elevation of the same object in which B B are the driving wheels, C C the connecting wheels attached to the shaft D. The spring E being made to press or draw down, the wheel C upon the wheels A and B so as to cause the requisite adhesion between them; whenever the driving wheel B is turned by the engine it will by the adhesion of its periphery to that of the connecting wheel C turn the said wheel; and the wheel C will by the adhesion of its periphery to the wheel A turn the said wheel A, and thus communicate the power of the engine as is required.

A great advantage of this method is that wheels of different diameters can be conveniently connected, for it is evident that whatsoever relation the diameters of the three wheels A B and C may have to each other the motion being communicated at their peripheries the velocities received will always be the same.

Another advantage is that wheels the axles of which do not remain parallel (as in the case of the driving and truck wheels in ordinary locomotives) may also be connected which could not otherwise conveniently be done without the intervention of cog wheels.

What I claim as my invention is—

Not the general application to the purposes of machinery of the principle of connecting wheels by adhesion as above described but the manner of adapting it to a locomotive engine by means of the spring E, and by which the advantages above named may be secured.

In testimony whereof I, the said ROBT. L. STEVENS, have hereto subscribed my name in the presence of the witnesses whose names are hereto subscribed on the 23rd day of March in the year of our Lord one thousand eight hundred and forty one.

ROBT. L. STEVENS. [L. S.]

Witnesses:
 FRANCIS Z. STEVENS,
 JOHN W. PIRSSON.